US011169622B2

(12) United States Patent
Chiu (10) Patent No.: US 11,169,622 B2
(45) Date of Patent: Nov. 9, 2021

(54) MOUSE DEVICE WITH ZERO GAPPED SWITCHING FOR RESISTANCE

(71) Applicant: Corsair Memory, Inc., Fremont, CA (US)

(72) Inventor: I-Ning Chiu, Taipei (TW)

(73) Assignee: Corsair Memory, Inc., Fremont, CA (US)

( * ) Notice: Subject to any disclaimer, the term of this patent is extended or adjusted under 35 U.S.C. 154(b) by 0 days.

(21) Appl. No.: 17/200,782

(22) Filed: Mar. 13, 2021

(65) Prior Publication Data
US 2021/0286449 A1    Sep. 16, 2021

(30) Foreign Application Priority Data

Mar. 13, 2020  (TW) .................................. 109108319

(51) Int. Cl.
*G06F 3/0354* (2013.01)
*G06F 3/038* (2013.01)

(52) U.S. Cl.
CPC .......... *G06F 3/03543* (2013.01); *G06F 3/038* (2013.01)

(58) Field of Classification Search
CPC .............................. G06F 3/03543; G06F 3/038
See application file for complete search history.

(56) References Cited

U.S. PATENT DOCUMENTS

| | | | | |
|---|---|---|---|---|
| 7,939,774 B2* | 5/2011 | Corcoran | ............ | G06F 3/03543 200/329 |
| 8,537,114 B2* | 9/2013 | Ma | ............ | H01H 13/85 345/163 |
| 2002/0140676 A1* | 10/2002 | Kao | ............ | G06F 3/03543 345/163 |
| 2006/0250364 A1* | 11/2006 | Gorbunov | ............ | G06F 3/0338 345/163 |
| 2011/0069008 A1* | 3/2011 | Kao | ............ | H01H 13/85 345/163 |
| 2011/0084905 A1* | 4/2011 | Chang | ............ | G06F 3/03543 345/163 |
| 2011/0279371 A1* | 11/2011 | Ma | ............ | G06F 3/03543 345/163 |
| 2020/0050294 A1* | 2/2020 | Hsu | ............ | G06F 3/04162 |

* cited by examiner

*Primary Examiner* — Ariel A Balaoing
(74) *Attorney, Agent, or Firm* — Carina M. Tan; Corsair Memory, Inc.

(57) ABSTRACT

A mouse device with zero gapped switching for resistance comprises a housing unit, at least one pressing unit, at least one switch unit, and at least one adjustment unit. The housing unit includes a housing that surrounds a housing space. The pressing unit is connected to the housing unit, and includes a pressing body and an extension body. The switch unit touches the pressing unit and includes a switch module. The adjustment unit includes an adjustment base and a first elastic body. The adjustment base is movable between a first position and a second position. When the adjustment base is located at the first position, the first elastic body applies a force in the direction toward the switch module on the extension body. When the adjustment base is located at the second position, the first elastic body applies a force opposite to the direction of the switch module on the extension body.

10 Claims, 11 Drawing Sheets

MOUSE DEVICE WITH ZERO GAPPED SWITCHING FOR RESISTANCE

CROSS REFERENCE TO RELATED APPLICATIONS

This application claims the benefit of priority to Taiwanese patent application no. 109108319 filed Mar. 13, 2020 entitled "Mouse Device with Zero Gapped Switching for Resistance", the contents of which are incorporated herein by reference in their entirety for all purposes.

TECHNICAL FIELD

The present invention relates to a mouse device with adjustable resistance, more particularly relates to a mouse device with zero gapped switching for resistance.

DESCRIPTION OF THE PRIOR ART

A conventional mouse is provided with left and right pressing plates which are used to be pressed downward respectively, so that a micro switch can be triggered to send a control instruction to a computer device. An elastic element is provided in the micro switch to restore the microswitch to its original state. The user's pressing force must be greater than the elastic force of the elastic element in order to trigger the micro switch, so that a control instruction can be sent out.

However, the conventional mouse has the following disadvantages in actual use:

1. Unchangeable Resistance

The user's pressing force must be greater than the elastic force of the elastic element in the micro switch. Only then can the micro switch be triggered and to send a control instruction. The elastic element provided in the micro switch cannot be easily replaced. The elastic force of the elastic element cannot be changed, and the changeable resistance cannot be provided by the conventional mouse.

2. Longer Processing Time for Sending an Instruction

The conventional mouse's pressing plate and the micro switch are spaced apart from each other, so the stroke for triggering the micro switch is longer. When pressing the mouse, the pressing plate must be pressed down to touch the micro switch, and then the micro switch is pressed to send an instruction. It takes a longer processing time for the conventional mouse to send the control instruction.

3. Poor Mouse Clicking

Since the conventional mouse's pressing plate and the micro switch are spaced apart from each other, if the elastic force of the elastic element in the micro switch is too weak, the user cannot feel the pressing travel stroke and the clicking from triggering the micro switch, which causes poor mouse clicking.

Therefore, it is desirable to provide a mouse by which the pressing plate touches the micro switch, and the resistance of the micro switch in the mouse can be quickly adjusted to improve the mouse clicking.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1:
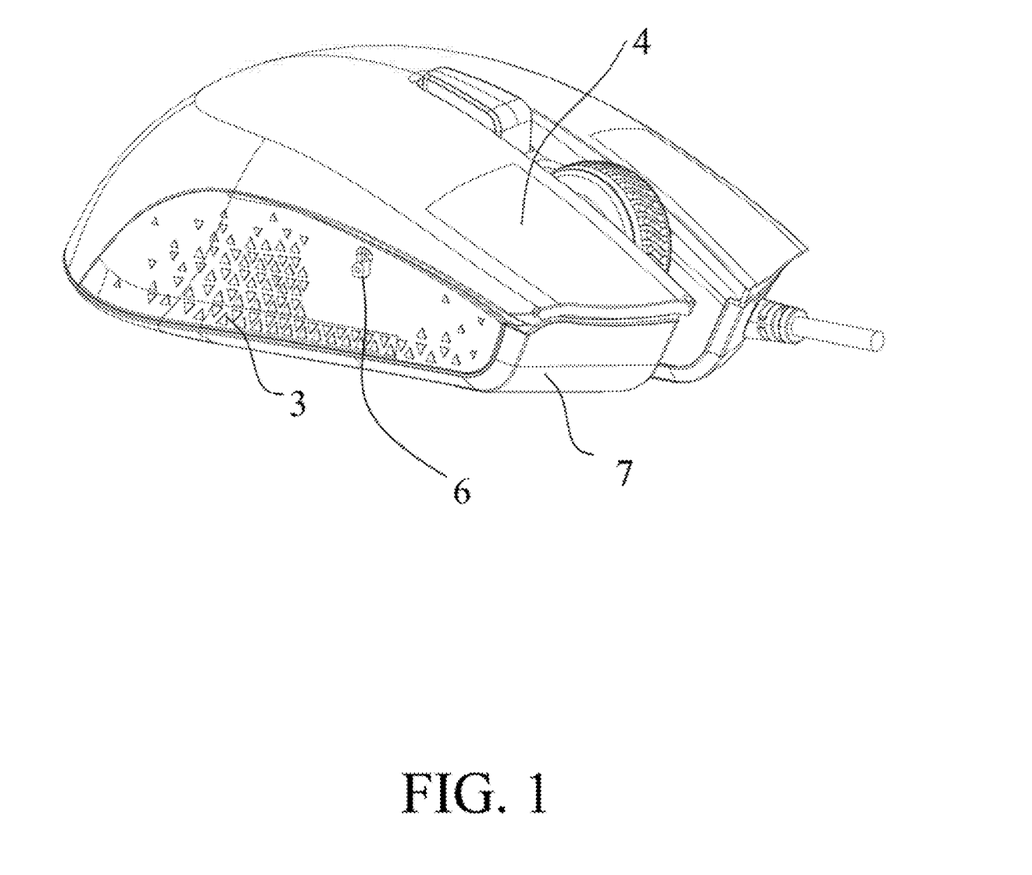
FIG. 1 illustrates a 3D diagram of a mouse device according to one of the embodiments of the present invention.
Figure 2:
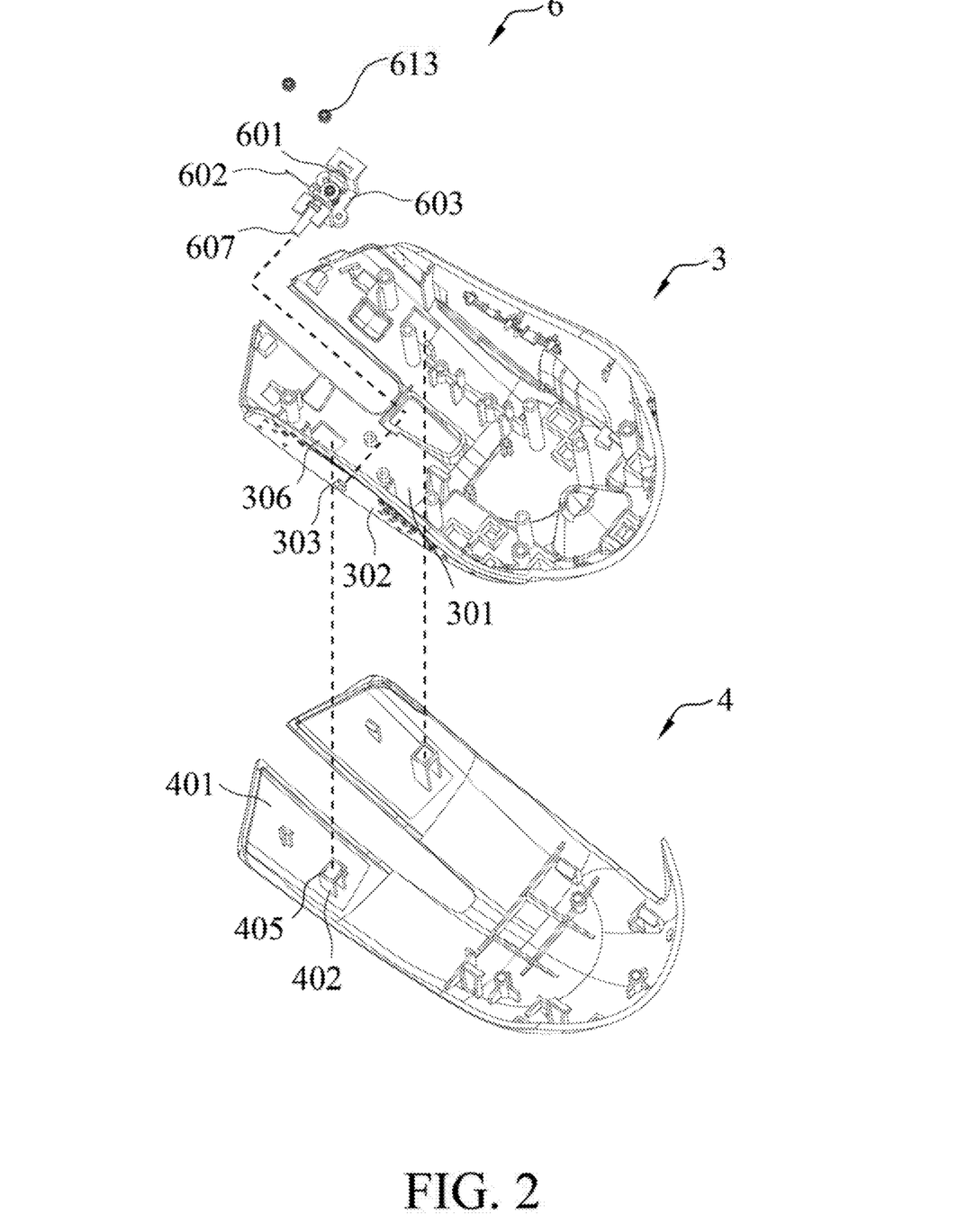
FIG. 2 illustrates a schematic exploded diagram of a pressing unit, a housing unit and an adjustment unit according to one of the embodiments.
Figure 3:
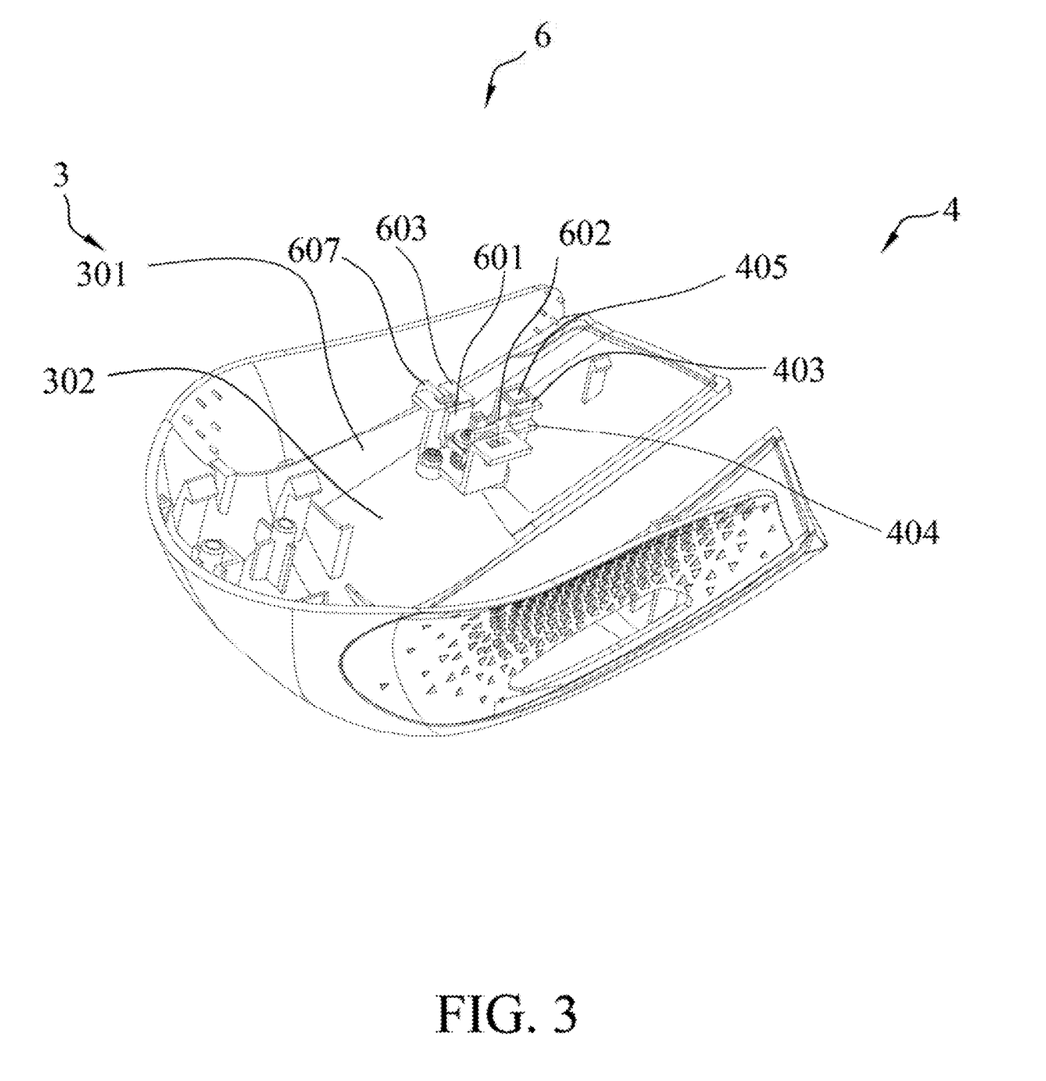
FIG. 3 illustrates a 3D diagram of the pressing unit, the housing unit, and the adjustment unit according to one of the embodiments.
Figure 4:
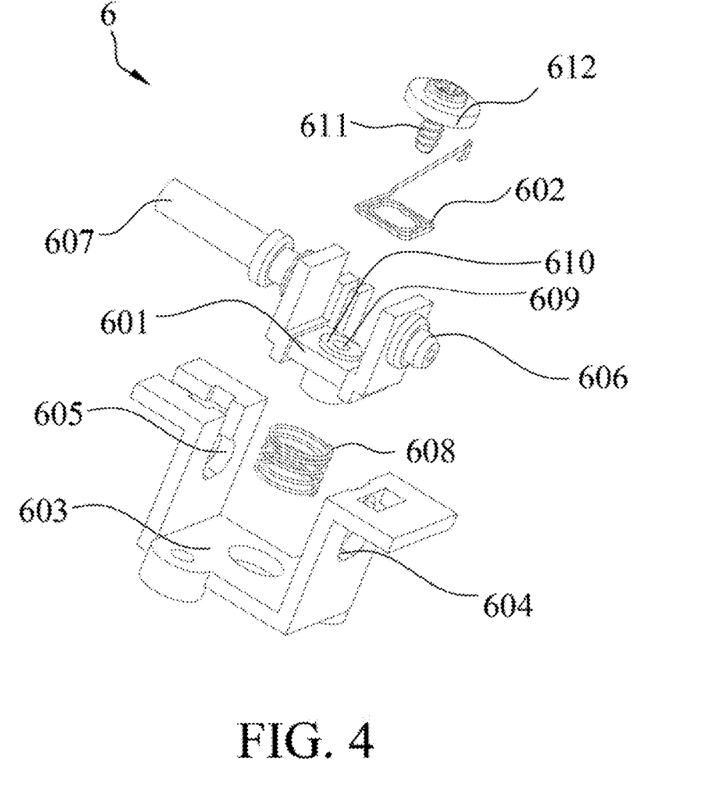
FIG. 4 illustrates a schematic exploded diagram of the adjustment unit according to one of the embodiments.

Refer to FIGS. 1, 2, and 3, one embodiment of a mouse device with zero gapped switching for resistance is provided. The mouse device with zero gapped switching for resistance comprises a housing unit 3, at least one pressing unit 4, at least one switch unit 5 (refer to FIGS. 8, 9, 10, 13 and 14), at least one adjustment unit 6, and a base unit 7. The switch unit 5 is fixed on the base unit 7. The housing unit 3 is disposed on the base unit 7 and assembled together. The pressing unit 4 is disposed on the housing unit 3, and the adjustment unit 6 is fixed inside the housing unit 3.

In one of the embodiments, the pressing unit 4, the switch unit 5 (refer to FIGS. 8, 9, 10, 13 and 14), and the adjustment unit 6 are disposed on the right button of the mouse device. In actual implementation, the pressing unit 4, the switch unit 5 (refer to FIGS. 8, 9, 10, 13 and 14), and the adjustment unit 6 can also be set on the left button, or set on both the left and right buttons of the mouse device, and shall not be construed as limiting the invention.

The housing unit 3 includes a housing 302 surrounding a housing space 301, an adjustment hole 303 disposed on the housing 302, a first support wall 304 (refer to FIGS. 7 and 12) disposed on the housing 302 and located on the bottom of the adjustment hole 303, a second support wall 305 (refer to FIGS. 7 and 12) disposed on the housing 302 and located in the adjustment hole 303 and spaced from the first support wall 304, an opening 306 disposed on the housing 302. In one of the embodiments, the adjustment hole 303 of the housing unit 3 has a shape close to "T". In actual implementation, the adjustment hole 303 may have other shapes, and shall not be construed as limiting the invention.

The pressing unit 4 is disposed above the housing unit 3. refer to FIG. 2, a schematic exploded diagram of the turned over housing unit 3 and pressing unit 4. The pressing unit 4 includes a pressing body 401, an extension body 402 connected to the pressing body 401, a first blocking wall 403 disposed on the extension body 402, a second blocking wall 404 disposed on the extension body 402, and a pressing wall 405 dispose on the extension body 402. Preferably, the pressing body 401 is disposed above the housing 302, and the extension body 402 protrudes from the lower surface of the pressing body 401 to engage with the opening 306 and enters into the housing space 301, so that the first elastic body 602 can touch the first blocking wall 403 or the second blocking wall 404 disposed on a side of the extension body 402. The pressing wall 405 is located on the bottom of the extension body 402, and touches the switch module 501 (refer to FIGS. 8, 9, 13 and 14). The distance between the first blocking wall 403 and the pressing body 401 is greater than the distance between the second blocking wall 404 and the pressing body 401 (refer to FIGS. 8, 9, 13 and 14), so the first blocking wall 403 is closer to the switch module 501 (refer to FIGS. 8, 9, 13 and 14) than the second blocking wall 404. The first blocking wall 403 faces the pressing body 401, and the second blocking wall 404 faces the switch unit 5 (refer to FIGS. 9 and 14). In one of the embodiments, the first blocking wall 403 and the second blocking wall 404 are disposed on a side of the extension body 402. In actual implementation, the first blocking wall 403 and the second blocking wall 404 are disposed in the extension body 402, and shall not be construed as limiting the invention.

Figure 8:
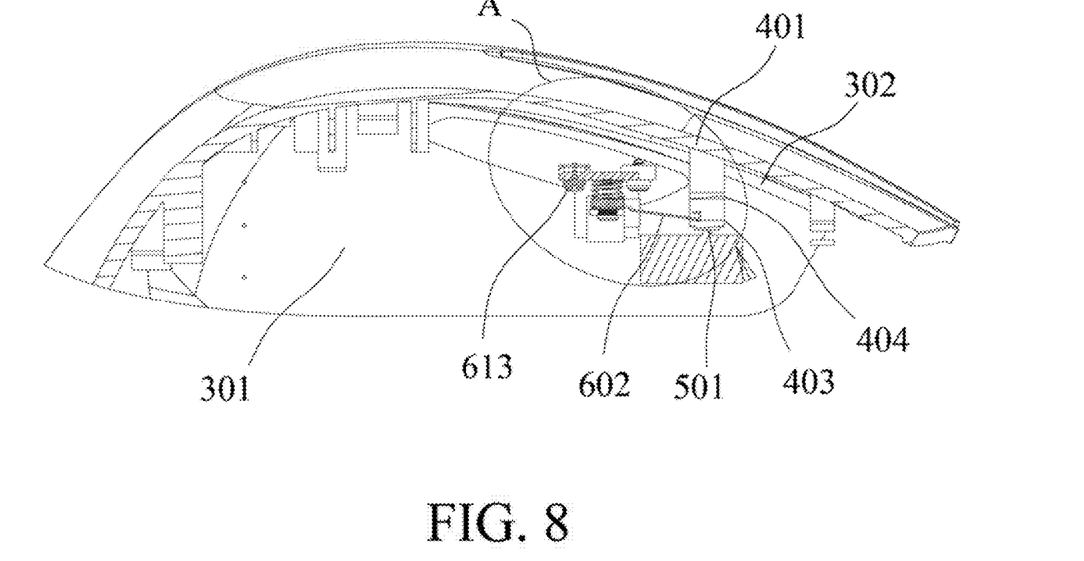
FIG. 8 illustrates a schematic partial cross section view of the pressing unit, the housing unit, the adjustment unit, and a switch unit according to one of the embodiments.
Figure 9:
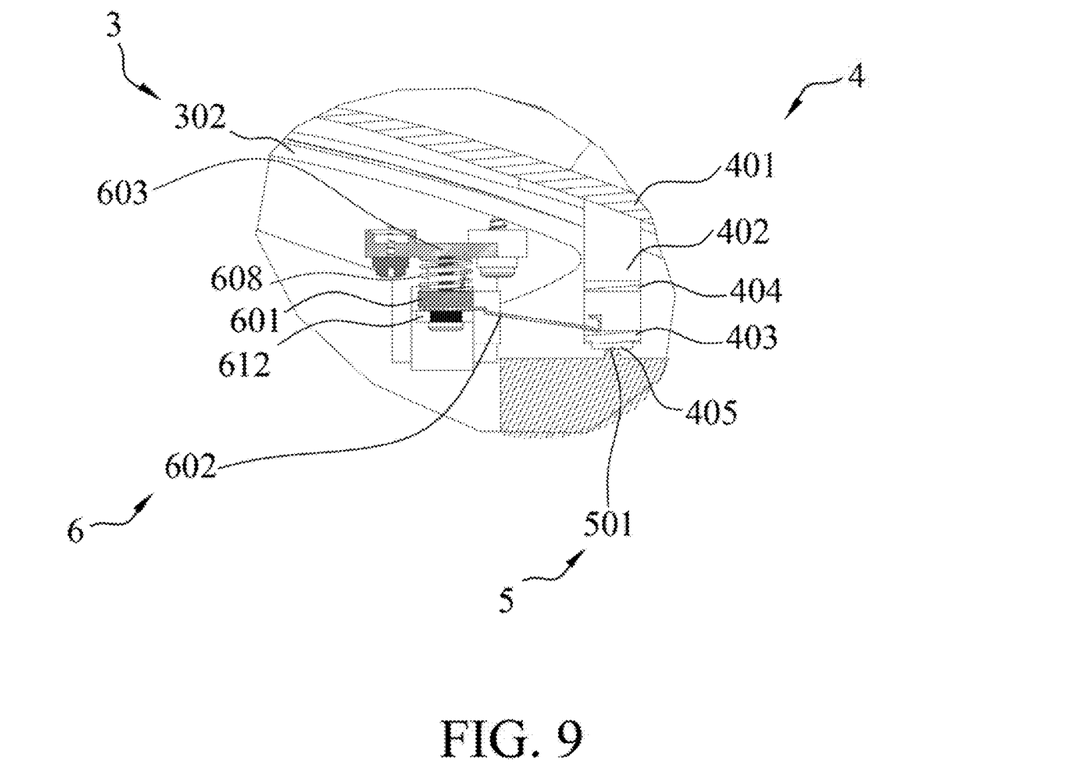
FIG. 9 illustrates a schematic partial side view of an enlarged view of the section A in FIG. 8 regarding the adjustment unit located at the first position and pressed against the first blocking wall of the housing unit.
Figure 10:
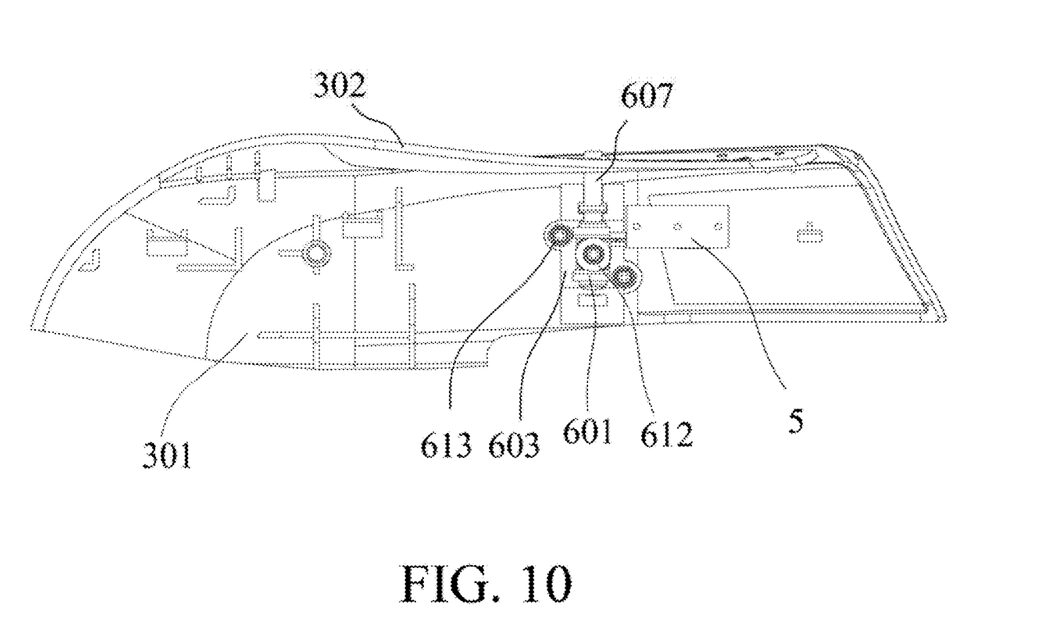
FIG. 10 illustrates a schematic partial bottom view of housing unit, the adjustment unit, and the switch unit on the right side of the mouse device in FIG. 8.
Figure 11:
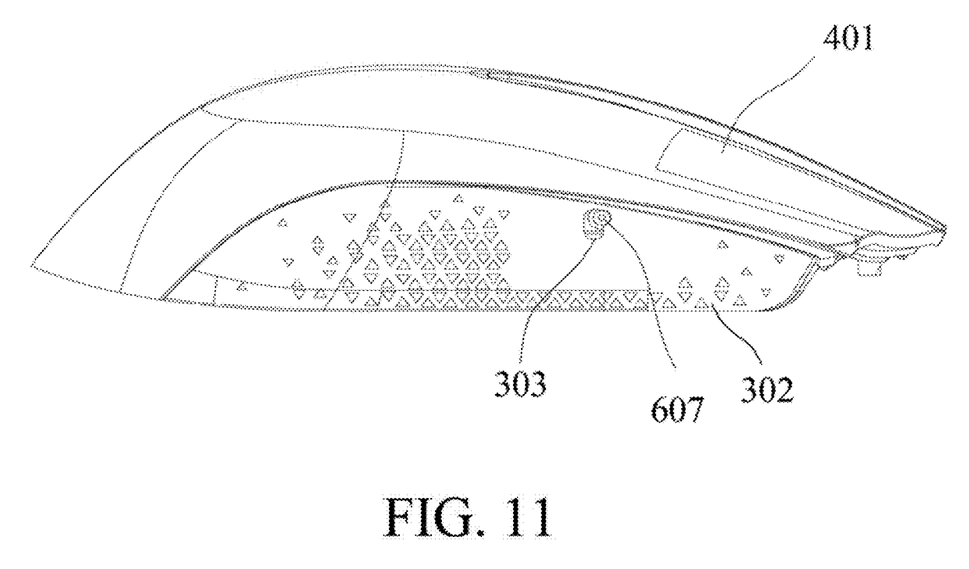
FIG. 11 illustrates a schematic side view of the adjustment lever of the present mouse device engaged with the adjustment hole and located at a second position according to one of the embodiments.

Refer to FIGS. 8 and 9, the switch unit 5 touches the pressing wall 405 of pressing unit 4, and includes a switch module 501 disposed in the housing space 301. The switch module 501 of switch unit 5 is disposed on the base unit 7 (not shown in the drawing), and the switch module 501 is a micro switch commonly installed in a mouse device. Since the method of disposing the switch component on the base is a common technique, it will not be described in detail herein.

Refer to FIGS. 2, 3, 4 and 5, the adjustment unit 6 includes an adjustment base 601 disposed in the housing space 301, a first elastic body 602 (refer to FIGS. 7 and 14) disposed on the adjustment base 601 and extending to the extension body 402, a fixed base 603 connected to the housing 302, a fixed hole 604 disposed on the fixed base 603, a guiding groove 605 disposed on the fixed base 603, a protrusion 606 disposed on the adjustment base 601 and combined with the fixed hole 604, an adjustment lever 607 disposed on the adjustment base 601, a second elastic body 608 disposed between the adjustment base 601 and the fixed base 603, a screw hole 609 disposed on the adjustment base 601, a circular convex body 610 disposed on the adjustment base 601 and located outside the screw hole 609, a stud 611 that is able to combine with the screw hole 609, and a flat disc 612 disposed on the stud 611. The fixed base 603 is fastened in the housing 302 by two screws 613. The adjustment lever 607 is moveable in the guiding groove 605, so that the adjustment base 601 can move relative to the fixed base 603.

Refer to FIGS. 4, 5, 7 and 12, the adjustment lever 607 is engaged with the guiding groove 605 and the adjustment hole 303, and protrudes from the housing 302 to be exposed to the outside. The shape of the guiding groove 605 corresponds to the shape the adjustment hole 303, so that the adjustment lever 607 is moveable in the guiding groove 605 and the adjustment hole 303.

Refer to FIGS. 4, 5, 9 and 14, preferably, the first elastic body 602 surrounds and is on the outside the circular convex body 610 and protrudes outward from the adjustment base 601 extending to the first blocking wall 403 or the second blocking wall 403 disposed on a side of the extension body 402 of the pressing unit 4. The combination of the stud 611 and the screw hole 609 enables the flat disc 612 to cooperate with the adjustment base 601, so that the first elastic body 602 can be fastened.

Figure 5:
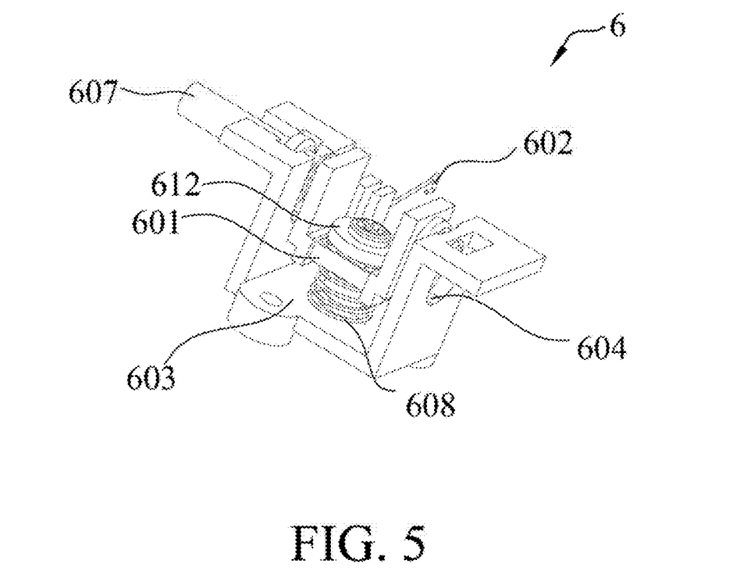
FIG. 5 illustrates a 3D diagram of the adjustment unit according to one of the embodiments.
Figure 6:
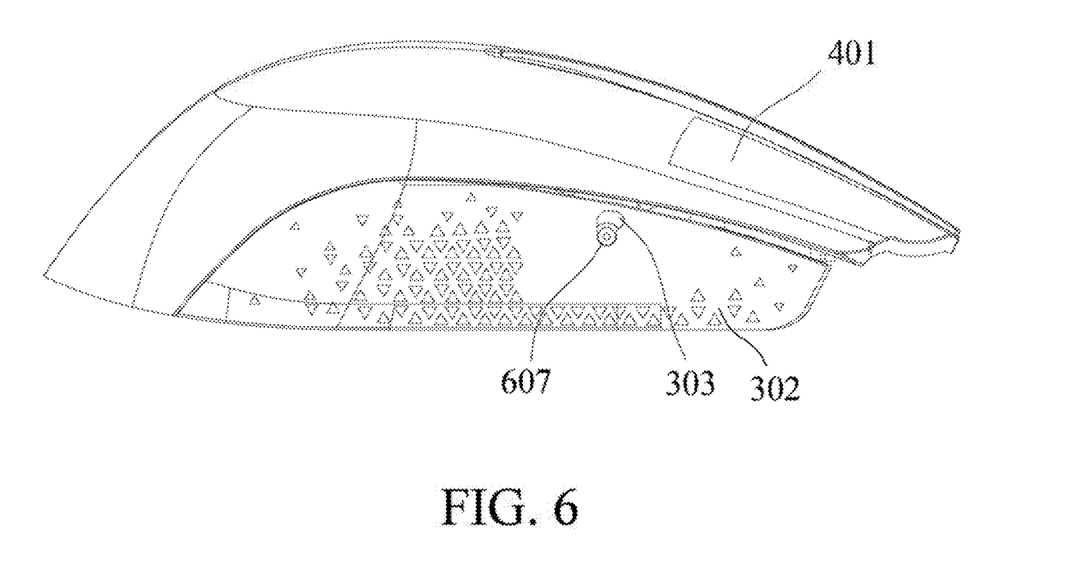
FIG. 6 illustrates a schematic side view of an adjustment lever of the present mouse device engaged with an adjustment hole and located at a first position according to one of the embodiments.
Figure 7:
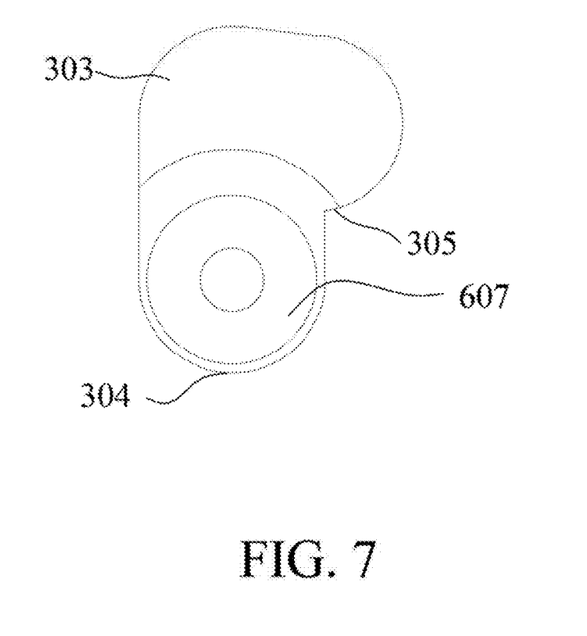
FIG. 7 illustrates a schematic partial side view of the adjustment lever engaged with the adjustment hole and located at the first position according to one of the embodiments.
Figure 12:
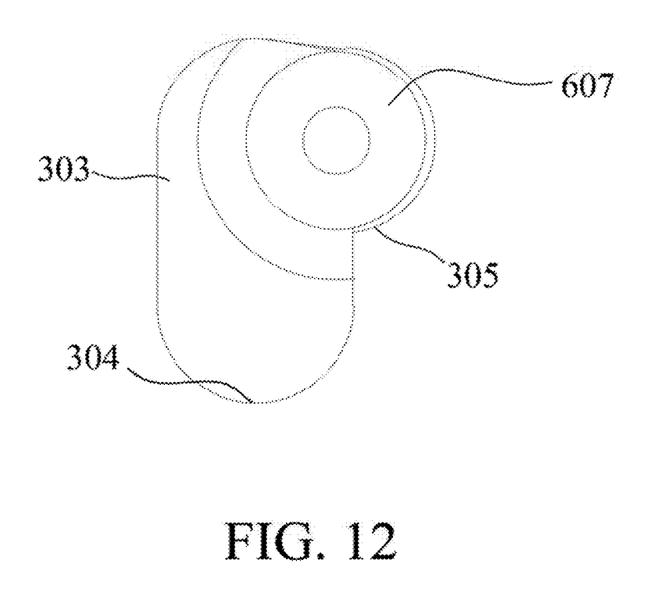
FIG. 12 illustrates a schematic partial side view of the adjustment lever engaged with the adjustment hole and located at the second position according to one of the embodiments.

Refer to FIGS. 5, 7 and 12, the adjustment base 601 is moveable between a first position and a second position. The user can move the adjustment lever 607 to control the position of the adjustment base 601. Γ-shaped adjustment hole 303, the second elastic body 608, and the adjustment lever 607 cooperate with each other to keep the adjustment base 601 at the first position or the second position.

Refer to FIGS. 6, 7, 8, 9 and 10, wherein FIG. 9 is a schematic partial side view of the section A in FIG. 8. For better elaboration and reading, FIG. 8 only shows the component structures related to the present invention, and others are not shown. When the adjustment base 601 is located at the first position, the first elastic body 602 presses downward against the first blocking wall 403. The first elastic body 602 applies a force in the direction toward the switch module on the first blocking wall 403 disposed on a side of the extension body 402, so that the pressing wall 405 can press against the switch module 501 to reduce the resistance of the switch module 501 and the pressing body 401, and the user can use less force to press the switch module 501. Moreover, the trigger of the switch module 501 is pressed down by some distance, so that the travel stroke of the switch module 501 is shortened. The first support wall 304 is used to support the adjustment lever 607, and the elastic force of the second elastic body 608 can help the adjustment lever 607 press against the first support wall 304 and keep the adjustment base 601 at the first position.

Figure 13:
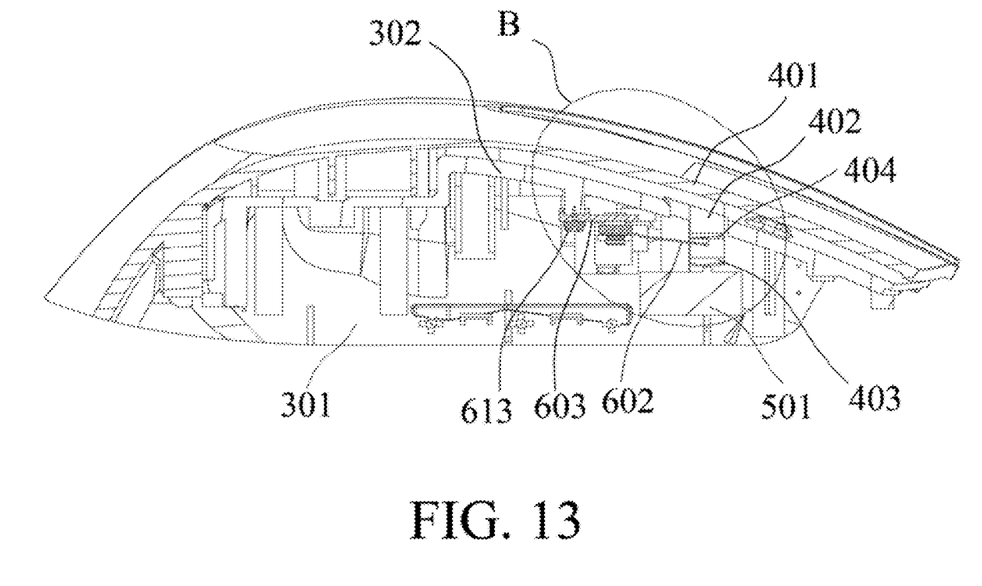
FIG. 13 illustrates a schematic partial cross section view of the pressing unit, the housing unit, the adjustment unit, and the switch unit according to one of the embodiments.
Figure 14:
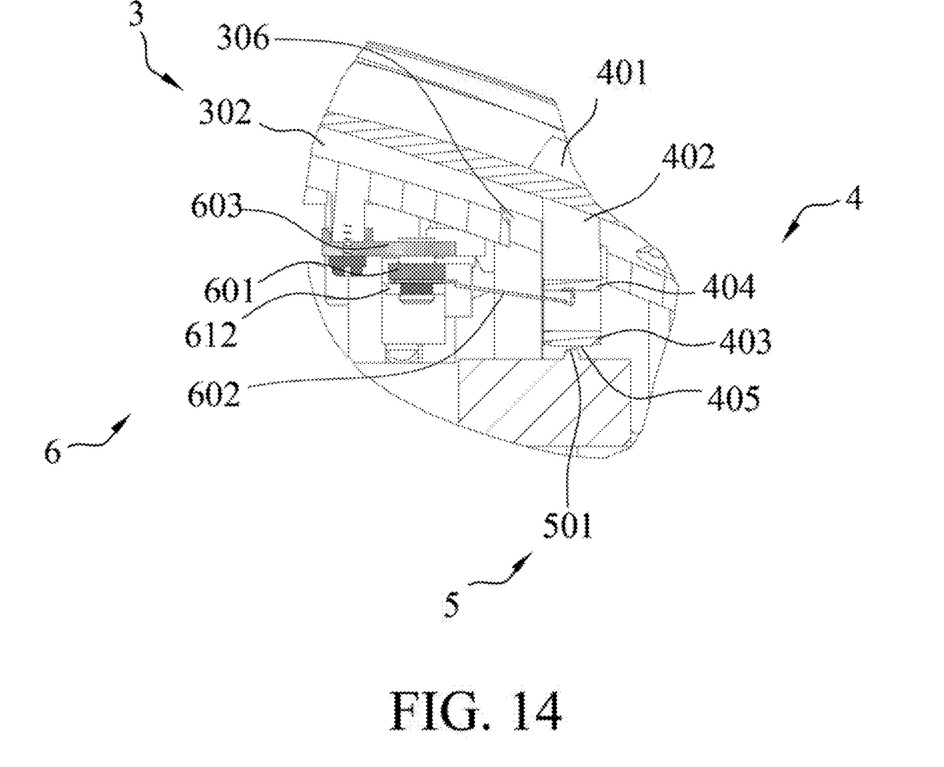
FIG. 14 illustrates a schematic partial side view of an enlarged view of the section B in FIG. 13 regarding the adjustment unit located at the second position and pressed against the second blocking wall of the housing unit.
Figure 15:
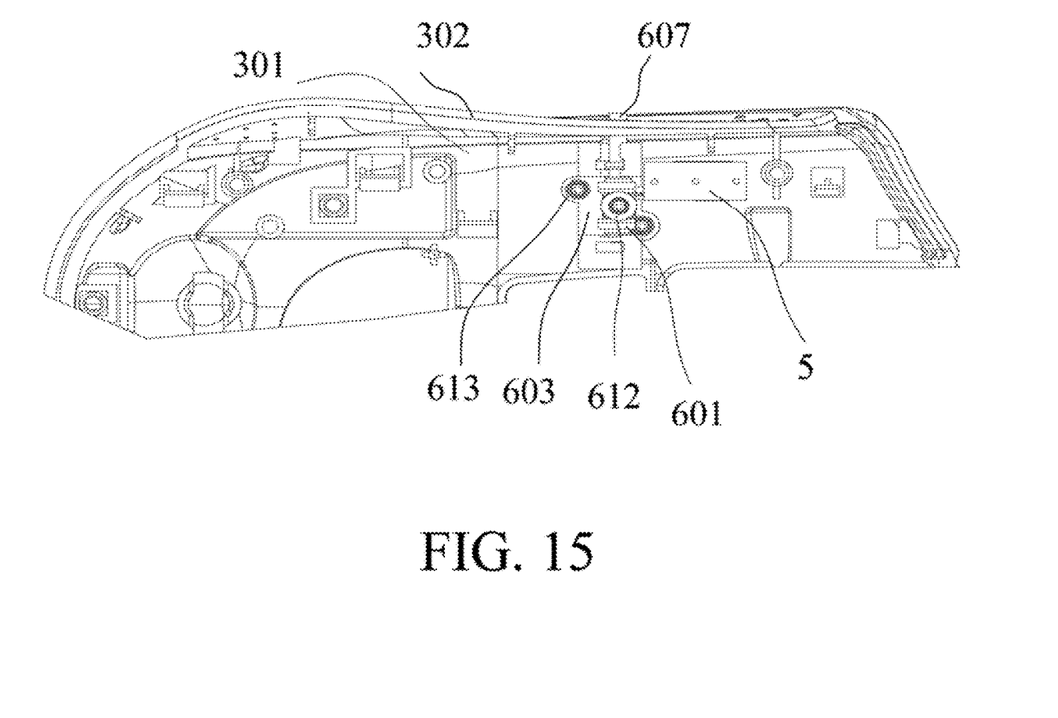
FIG. 15 illustrates a schematic partial bottom view of housing unit, the adjustment unit, and the switch unit on the right side of the mouse device in FIG. 13.

Refer to FIGS. 11, 12, 13, 14 and 15, wherein FIG. 14 is a schematic partial side view of the section B in FIG. 13. When the adjustment base 601 is located at the second position, the first elastic body 602 presses upward against the second blocking wall 404, and the first elastic body 602 applies a force in the direction opposite to the direction of the switch module 501 on the second blocking wall 404 disposed on a side of the extension body 402, so that the resistance of the switch module 501 and the pressing body 401 can be increased, and the user needs to apply greater pressing force on the switch module 501. Moreover, the trigger of the switch module 501 is moved upward by some distance, so that the travel stroke of the switch module 501 is elongated. The second support wall 305 is used to support the adjustment lever 607, and the elastic force of the second elastic body 608 can help the adjustment lever 607 press against the second support wall 305 and keep the adjustment base 601 at the second position.

Refer to FIGS. 5, 6, 7, 9, 12 and 14, the adjustment hole 303 has a "T" shape. When the adjustment base 601 is located at the first position, the user can use a finger to move the adjustment lever 607 upward and push forward the same, so that the adjustment base 601 can be moved to the second position. After the user releases the finger, the second elastic body 608 presses against the adjustment base 601, so that the adjustment lever 607 can touch the second support wall 305, and keep the adjustment base 601 at the second position.

Refer to FIGS. 5, 7, 9, 11, 12 and 14, when the adjustment base 601 is located at the second position, the user can push the adjustment lever 607 backward with a finger. When the user releases the finger, the second elastic body 608 pushes the adjustment base 601, so that the adjustment lever 607 can touch the first support wall 304, and the adjustment base 601 can reach the first position, and maintain the same position.

Figure 16:
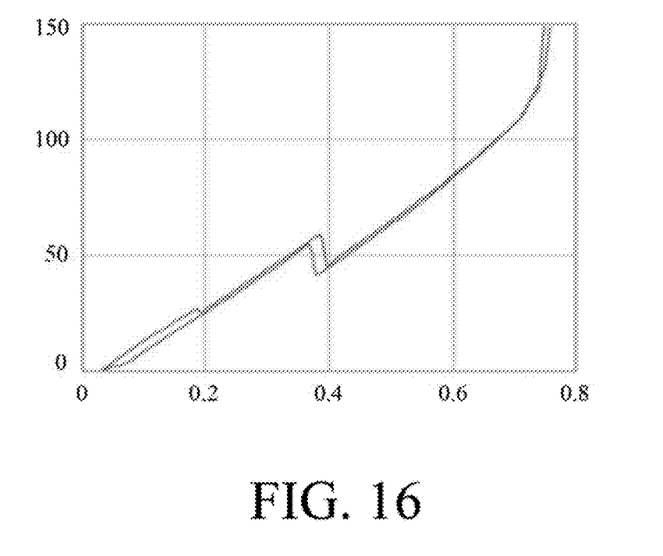
FIG. 16 is an analysis chart illustrating the resistance and stroke of a conventional mouse button.

Refer to FIG. 16, a chart illustrating the resistance and stroke of a conventional mouse button. The horizontal axis 802 indicates the pressing stroke (mm) of the mouse button, and the vertical axis 801 indicates the resistance (gf, gf=gram force) for pushing down the mouse button. The line Z indicates a test result of the conventional mouse button, which is not provided with a structure of switching the resistance. The micro switch itself has a pressing stroke, and the mouse button (plastic sheet) also has an elastic force. In addition, the micro switch and the mouse button are spaced from each other. Therefore, when pressing the conventional mouse button, a certain distance is required to enable the mouse button to touch the micro switch, and then the micro switch is pressed to trigger a control instruction. It can be seen from the line Z, since the mouse button and the micro switch are spaced from each other, the elastic force produced from pressing the mouse button does not start from the zero position of the pressing stroke (that is, 0 mm), but starts from about 0.05 mm to receive the resistance, which would cause a poor mouse clicking.

Figure 17:
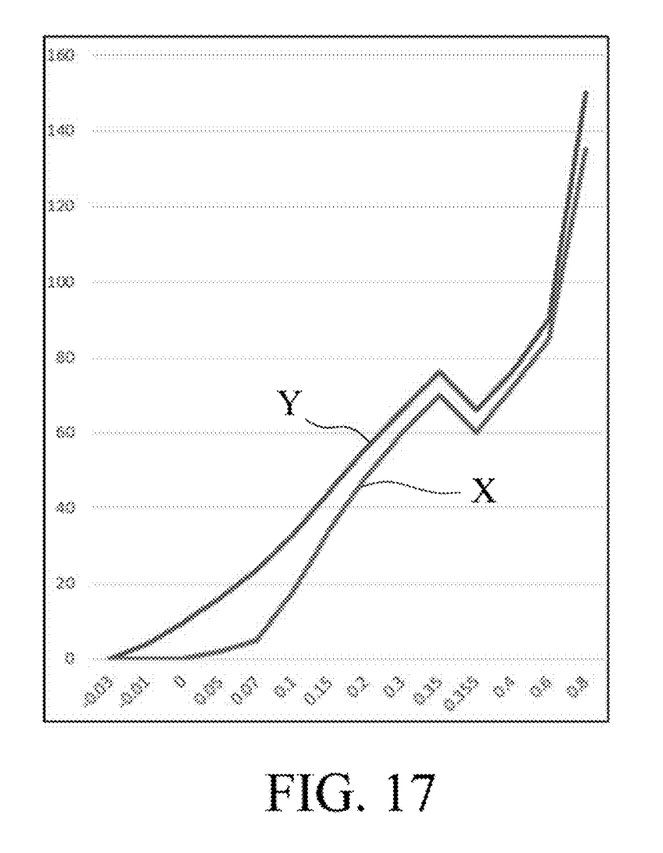
FIG. 17 is an analysis chart illustrating the resistance and stroke of the mouse device according to one of the embodiments.

Refer to FIGS. 9, 14, and 17, a chart illustrating the resistance and stroke of the mouse device according to one of the embodiments. The horizontal axis 811 indicates the pressing stroke (mm) of the mouse button, and the vertical axis 812 indicates the resistance (gf=gram force) for pushing down the mouse button. The line X indicates a test result of the light-load resistance (the adjustment base 601 is located at the first position), and the line Y indicates a test result of the heavy-load resistance (the adjustment base 601 is located at the second position). The pressing wall 405 touches the switch module 501, and the origin of the travel stroke starts from 0 on the horizontal axis. A negative value indicates that the switch module 501 is lifted and the travel stroke is increased (see the line Y). A positive value indicates that the switch module 501 is pressed down and the travel stroke is reduced (see the line X). It can be known from FIG. 17 that in the line X, the first elastic body 602 of the adjustment unit 6 presses down the first blocking wall 403 and shortens the pressing stroke of the switch module 501 by about 0.05 mm to 0.07 mm. Under this condition, the switch module 501 reduces the resistance by about 5 gf. In the line Y, the first elastic body 602 of the adjustment unit 6 lifts the second blocking wall 404 to increase the pressing stroke of the switch module 501 by about 0.03 mm to 0.05 mm. Under this condition, the switch module 501 will increase resistance by about 5 gf. When the user presses down the pressing unit 4, the user will always receive more resistance of the first elastic body 602., so the mouse clicking can be effectively improved. In actual implementation, the experimental data will be affected by the distance between the first elastic body 602, the first blocking wall 403 and the second blocking wall 404, or by the travel distance of the adjustment base 601, and shall not be construed as limiting the invention.

Refer to FIGS. 1-17, with above description, the present invention of a mouse device with zero gapped switching for resistance has following benefits:

1. The Resistance From Pressing the Button Can be Changed

The adjustment lever 607 controls the adjustment base 601 to be located at the first position or the second position. When the adjustment base 601 is located at the first position, the resistance of the switch unit 5 can be reduced. When the adjustment base 601 is located at the second position, the resistance of the switch unit 5 can be increased.

2. Zero Gapped Switching for Resistance

When the adjustment base 601 is located at the first position or the second position, the pressing wall 405 of the pressing unit 4 always touches the switch module 501, which provides zero gapped switching for resistance, and the pressing stroke of the switch module 501 is reduced when at the first position, and the pressing stroke of the switch module 501 is increased when at the second position.

3. Improved Mouse Clicking

When the adjustment base 601 is located at the second position, the user presses down the pressing unit 4, and the pressing unit 4 always bears the elastic force of the first elastic body 602, so the user can obviously experience the distance of pressing, and the feedback from triggering the switch module 501, so that the mouse clicking can be improved.

In conclusion, the Γ-shaped adjustment hole 303, the second elastic body 608, and the adjustment lever 607 cooperate with each other to enable the adjustment base 601 to stay at the first position or the second position. When the adjustment base 601 is located at the first position, the resistance and pressing stroke of the switch module 501 can be reduced. When the adjustment base 601 is located at the second position, the resistance and pressing stroke can be increased to improve the mouse clicking. Therefore, the aforementioned objective of the present invention can be achieved.

I claim:

1. A mouse device with zero gapped switching for resistance comprising:
    a housing unit, including a housing surrounding a housing space;
    at least one pressing unit, connected to the housing unit, wherein the pressing unit includes a pressing body and an extension body connected to the pressing body;
    at least one switch unit, touching the pressing unit, wherein the switch unit includes a switch module disposed in the housing space; and
    at least one adjustment unit, including an adjustment base disposed in the housing space, and a first elastic body disposed on the adjustment base and extending to the extension body, wherein the adjustment base is movable between a first position and a second position, when the adjustment base is located at the first position, the first elastic body applies a force in the direction toward the switch module on the extension body, when the adjustment base is located at the second position, the first elastic body applies a force opposite to the direction of the switch module on the extension body.

2. The mouse device with zero gapped switching for resistance as claimed in claim 1, wherein the adjustment unit further includes a fixed base connected to the housing, a fixed hole disposed on the fixed base, a guiding groove disposed on the fixed base, a protrusion disposed on the adjustment base and combined with the fixed hole, and an adjustment lever disposed on the adjustment base and engaged within the guiding groove, the adjustment lever is movable in the guiding groove, so that the adjustment base moves relative to the fixed base.

3. The mouse device with zero gapped switching for resistance as claimed in claim 1, wherein the housing unit further includes an adjustment hole disposed on the housing, and the adjustment unit further includes an adjustment lever disposed on the adjustment base wherein such adjustment lever is engaged with the adjustment hole.

4. The mouse device with zero gapped switching for resistance as claimed in claim 1, wherein the housing unit further includes an adjustment hole disposed on the housing, and the adjustment hole of the housing unit has a shape close to "Γ".

5. The mouse device with zero gapped switching for resistance as claimed in claim 4, wherein the housing unit further includes a first support wall disposed on the housing and located on the bottom of the adjustment hole, and a second support wall disposed on the housing and located in the adjustment hole and spaced from the first support wall, the adjustment unit further includes an adjustment lever disposed on the adjustment base and engaged with the adjustment hole, the first support wall is used to support the adjustment lever and keep the adjustment base at the first position, the second support wall is used to support the adjustment lever and keep the adjustment base at the second position.

6. The mouse device with zero gapped switching for resistance as claimed in claim 1, wherein the adjustment unit further includes a fixed base connected to the housing, and a second elastic body disposed between the adjustment base and a fixed base of the adjustment unit.

7. The mouse device with zero gapped switching for resistance as claimed in claim 1, wherein the adjustment unit further includes a screw hole disposed on the adjustment base, a circular convex body disposed on the adjustment base and located outside the screw hole, a stud that is able to combine with the screw hole, and a flat disc disposed on the stud, the first elastic body is on the outside the circular convex body and protrudes outward from the adjustment base, the combination of the stud and the screw hole enables the flat disc to cooperate with the adjustment base, so that the first elastic body is fastened.

8. The mouse device with zero gapped switching for resistance as claimed in claim 1, wherein the housing unit further includes an opening disposed on the housing, and the extension body is engaged with the opening.

9. The mouse device with zero gapped switching for resistance as claimed in claim 1, wherein the pressing unit further includes a first blocking wall disposed on the extension body, and a second blocking wall disposed on the extension body, the distance between the first blocking wall and the pressing body is greater than the distance between the second blocking wall and the pressing body.

10. The mouse device with zero gapped switching for resistance as claimed in claim 1, wherein the pressing unit further includes a pressing wall disposed on the extension body, and the pressing wall touches the switch module.

* * * * *